(12) United States Patent
Downs, III

(10) Patent No.: US 8,119,975 B2
(45) Date of Patent: *Feb. 21, 2012

(54) HIGH SPEED DETERMINISTIC, NON-CONTACT, 3-AXIS FREE TRAJECTORY MEASUREMENT DEVICE AND FREE TRAJECTORY IMAGING DEVICE

(75) Inventor: Justin G. Downs, III, Henderson, NV (US)

(73) Assignee: Crowsocs, Inc., Santa Cruz, CA (US)

( * ) Notice: Subject to any disclaimer, the term of this patent is extended or adjusted under 35 U.S.C. 154(b) by 897 days.

This patent is subject to a terminal disclaimer.

(21) Appl. No.: 12/080,801

(22) Filed: Apr. 4, 2008

(65) Prior Publication Data

US 2010/0321742 A1  Dec. 23, 2010

Related U.S. Application Data

(60) Provisional application No. 60/995,625, filed on Sep. 26, 2007.

(51) Int. Cl.
*H01J 40/14* (2006.01)
(52) U.S. Cl. .................... 250/221; 250/208.1
(58) Field of Classification Search .............. 250/221, 250/227.13, 234, 235, 208.1; 382/313, 319; 358/473, 474
See application file for complete search history.

(56) References Cited

U.S. PATENT DOCUMENTS

| | | | |
|---|---|---|---|
| 4,984,287 A | 1/1991 | Massoudi | |
| 5,644,139 A * | 7/1997 | Allen et al. | 250/557 |
| 5,994,710 A | 11/1999 | Knee et al. | |
| 6,414,293 B1 * | 7/2002 | Oliver | 250/208.1 |
| 6,618,038 B1 | 9/2003 | Bohn | |
| 7,102,617 B2 | 9/2006 | Gust | |
| 2005/0068299 A1 | 3/2005 | Ore-Yang | 345/164 |
| 2006/0126927 A1 | 6/2006 | Vesely et al. | 382/154 |
| 2007/0103436 A1 | 5/2007 | Kong | 345/157 |
| 2007/0139376 A1 | 6/2007 | Giles | 345/163 |
| 2007/0152966 A1 | 7/2007 | Krah et al. | 345/163 |
| 2007/0182725 A1 | 8/2007 | Pittel | 345/179 |

\* cited by examiner

*Primary Examiner* — Que T Le
(74) *Attorney, Agent, or Firm* — Mark A Litman & Associates, P.A.

(57) ABSTRACT

A data providing device associated with a trajectory sensing system has at least a frame. The frame supports at least two sensing receivers and at least one emitter for the sensing receivers. The sensors sense movement and/or position with respect to a surface. The frame supports a third sensor that senses information (e.g., image data) from the surface at least in addition to movement. There is also a communication link from the two sensing receivers to a data storage device; a communication link from the third sensor to a data storage device or to a processor and then a data storage device; and a processor that determines position of the system with respect to the surface based at least in part on data from the two sensing receivers.

9 Claims, 6 Drawing Sheets

FIG. 4D

SONATE.
Op.27. Nº 2.
(Sonata quasi una Fantasia.)
Der Gräfin Julie Guicciardi gewidmet.

Adagio sostenuto.

Si deve suonare tutto questo pezzo delicatissimamente e senza sordini.

14.

1) *sempre pianissimo e senza sordini.*

1) The pedal indications are Beethoven's.

HIGH SPEED DETERMINISTIC, NON-CONTACT, 3-AXIS FREE TRAJECTORY MEASUREMENT DEVICE AND FREE TRAJECTORY IMAGING DEVICE

RELATED APPLICATIONS DATA

This Application claims priority from U.S. Provisional Patent Application 60/995,625, filed Sep. 26, 2007.

BACKGROUND OF THE INVENTION

1. Field of the Invention

The present invention relates to the field of scanning technology, position sensing, and combinations of scanning and position sensing.

2. Background of the Art

Scanners used for imaging have typically been constrained by the need to have the CIS step repeatedly a finite distance. At each step, a scan is taken and stored in some memory device, usually at sequential addresses within the device. This type of system is limited by the need to constrain the CIS sensor motion to step in only 1 planar direction. If the motion of the CIS sensor is not parallel to previous motion, the possibility would then exist to store identical data at several different address locations in memory.

Complex motion analysis in imaging systems are known, such as in U.S. Patent Application No. 20070182725 (Pittel) which describes a portable electronic device, a digital camera associated with the portable electronic device, and software configured to run on the portable electronic device and to derive handwriting and control information from hand motion of a writing instrument in the vicinity of the digital camera.

A surface configurable mouse is described in Published U.S. Application 20070152966 (Krah et al.) as a configurable mouse with an extended sensing surface, which provides the mouse a customizable, programmable or adaptable way of generating inputs, the mouse including an arbitrarily shaped grippable member having a 3D shape, a position detection mechanism that detects the movement of the mouse along a surface, a multipoint touch detection mechanism that detects one or more objects that are contacting or in close proximity to a substantially large portion of the grippable member, and a controller for processing signals generated by the position detection mechanism and multipoint touch detection mechanism. The Krah et al. reference discloses [0108] Different arrangements of lights and sensors may be used. In one embodiment, a single sensor and a single light system is used. In another embodiment, a single sensor and multiple light systems firing at different times is used. This may be done to acquire stereoscopic images. In another embodiment, multiple sensors and a single light source is used. Noise rejection from ambient light may be accomplished by means of synchronous detection, i.e., varying the light and intensity of illumination source and correlating the resulting image data. Generally speaking, synchronous detection is accomplished by pulsing the light source the frequency at which images are acquired, thus rejecting any out of band noise sources and enabling the in band light to pass. The pass band is referred to as the narrow band of frequencies that are centered around the image acquisition frequency. Only frequencies that are within the pass band (in band) are detected, frequencies outside the pas band are rejected. By way of example, ambient light (either from incandescent lamps, neon lamps (60 Hz flicker) are possible noise sources. In yet another embodiment, multiple sensors and multiple light systems firing at different times is used.

Three dimensional scanning can also be provided and effected with mouse scanning as shown in Published U.S. Application 20060126927 (Vesely).

Published U.S. Patent Application 20050068299 (Ore-Yang) describes a two-dimensional coordinate signal input apparatus that includes a scrollball module and a microprocessor. In which, the scrollball module has a scrollball and at least two wheels in contact with the scrollball for revolving thereby, so that the scrollball module is capable of detecting a rolling movement of the scrollball and outputting a rolling signal in response to an impetus caused by a user. And the microprocessor has a scrollball program defining a two-dimensional coordinate system for receiving the rolling signal from the scrollball module and transforming the rolling signal into a two-dimensional control signal to control a scrolling movement of a scrollbar of an application program. The two-dimensional coordinate system has four zones so that when the scrollball moves toward a certain zone of the four zones, the scrollbar of the application program is moved toward a certain direction corresponding to the certain zone.

All references cited herein are incorporated in their entirety within this document.

SUMMARY OF THE INVENTION

A reading and trajectory positioning system are combined into a single moveable element that combined both functions. The trajectory positioning component of the moveable element comprises two sensors at a fixed distance of separation between the two elements. Each sensor is capable of receiving information from at least one emitter and preferably two emitters (one for each receiver) on the moveable element. The combination of the two sensors enables tracking of position (dual sensing of position) by reading length of movement, width of movement (2-dimensional plotting) and determining an angularity component so that an absolute position and direction of movement of the moveable element can be determined. Also on the moveable element is a distinct and separate third sensing device that senses and reports data (other data) that is distinct from position or movement of the moveable element. The third sensor may report data on the surface over which the moveable element is being moved (e.g., topography, alphanumerics, musical notes, sensed data such as temperatures, moisture content, infrared reflected signals to determine subsurface properties, magnetic readings, holographic readings, optically reflected readings, and any other physical or chemical properties that can be read by a sensor moved over or along a surface).

The information provided on the trajectory readings are used to correct, normalize, interpret or refine the other information sensed from the third sensor. The content of the instantaneous position data can be used in real-time, present time or future time in association with the third sensed data obtained or acquired contemporaneously with the position data to refine, enhance, correct, orient, reorient, compile, improve, organize, translate or otherwise treat the content of the third data.

BRIEF DESCRIPTION OF THE FIGURES

FIG. 4D shows a completely reconstructed musical score created from multiple individual hand sweeps such as those of FIGS. 4A and 4D.

DETAILED DESCRIPTION OF THE INVENTION

Figure 1:
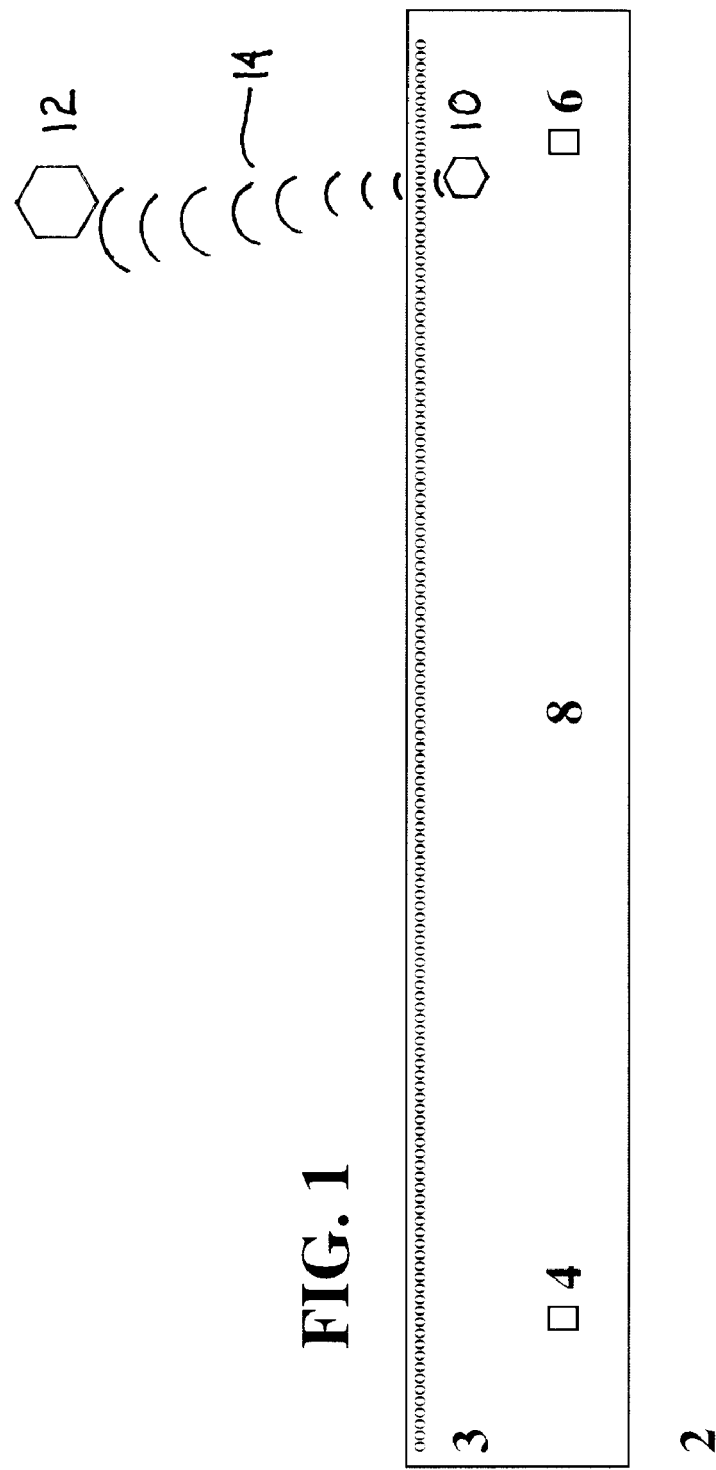
FIG. 1 shows a scanning face of a moveable device according to the present technology having a line of image scanners/sensors and two emitting/receiving position LED sensors.
Figure 2:
FIG. 2 shows a distorted image read from a scanner.
Figure 3:
FIG. 3 shows a corrected image of the distorted image from FIG. 2.

The present technology includes both methods and devices such as data providing device associated with a trajectory sensing system comprising: a frame; the frame supporting at least two sensing receivers and at least one emitter for the sensing receivers, the sensors sensing movement with respect to a surface; the frame supporting a third sensor that senses information from the surface at least in addition to movement; a communication link from the two sensing receivers to a data storage device; a communication link from the third sensor to a data storage device; and a processor that determines position of the system with respect to the surface based at least in part on data from the two sensing receivers. The data providing device may have the processor also determine a position of each of the at least two sensing receivers with respect to time. The sensing devices are preferably image sensing devices. The processor preferably receives data from the sensing devices and executes code to correct received data with respect to distortions in received image data.

A method is provided according to the present technology for determining the location of at least two points on a scanning device with respect to a surface during obtaining of data from the surface or under the surface, the method comprising:
while moving a device across a surface and while obtaining data, taking at least two position readings on the surface from the device from fixed locations on the device;
while taking two position readings from the device, obtaining information on or under the surface from a sensor on the device;
using readings from the at least two position readings to determine a position of the scanning device relative to the surface; and
using the position readings of the device relative to the surface to modify the information obtained from on or under the surface.

The taking of two position readings is preferably done continuously while moving the device and preferably the sensor is an image sensor and the information obtained is image data. The device may be moved manually across the surface. The readings from the at least two position sensors and the information obtained from on or under the surface are used to correct distortion in the obtained information and then to store corrected information. The device may comprise an optical navigation device capable of performing deterministic motion measurements wherein the output of the device is a measurement of two-dimensional motion on a planar surface. The device may have at least one additional subcomponent selected from the group consisting of:
a) processing means to provide signal conversion capability between the optical navigation device and an at least 4 bit data port;
b) the at least two sensors are separated by a distance of at least 0.5 cm such that a $3^{rd}$ motion axis of rotation about a surface normal vector (z-axis) may be derived using x-y motion data recovered from the at least two sensor;
c) the device is coupled with an external field programmable gated array (FPGA or ASIC) or CPU ?? to provide signal processing capability to determine rotation about the surface;
d) processor for deriving free trajectory motion of an arbitrary center of rotation assumed or defined on the device;
e) storage for recording free trajectory motion of the arbitrary center of rotation.
f) communication means in the device for transfer of the free trajectory motion and/or the stored motion of claim;
g) communication system enabling the free trajectory motion information to be transferred in the form of displacement in an x and y direction and rotation about a defined axis;
h) sensor selected from the group consisting of contact image sensors or CMOS sensors;
i) a processor receiving output of the CIS and which stores the output according to a storage algorithm determined in part by the device operation characteristics;
j) a processor containing executable code for an imaging storage algorithm utilizing the free trajectory path information and repeated output scans of an image sensor operated in conjunction with the trajectory sensor such that the free path trajectory is compensated for during memory storage of the CIS output;
k) a processor containing executable code for the storage algorithm to compensate for the free path trajectory by determining the storage address for free path compensation mathematically;
l) containing executable code for the storage address algorithm to be determined mathematically is calculated by a processor;
m) a field programmable gated array or ASIC or CPU ?? for determining mathematically the storage algorithm;
n) wherein the device comprises sensors such as a mouse sensor typically used for non-deterministic motion detection as when coupled to a computer cursor.

A single device according to technology described herein may have both two sets of optical emitter-optical receiver pairs (at least two receivers and one emitter, and preferably two emitters and two receivers as pairs) spatially fixed within the single device along with a separate sensor that provides a distinctly different type of information or data as compared to the two sets of emitters/receivers. As an example of a functional device, two standard computer mouse components or advanced cursor directing mouse components from a computer system may be spatially fixed together so that two 2D scanning points are moved in tandem as the movement of the device. Ordinarily in the prior art, a single set of emitter/receiver on the mouse provides only two degrees of observation image collection spatial information, while the paired two sets of emitters and receivers offers data content retrievable for another degree of rotation that can provide data.

An alternative way of describing one aspect of technology disclosed herein is as data providing device associated with a trajectory sensing system comprising: a) a frame; b) the frame supporting at least two sensing receivers and at least one emitter for the sensing receivers, the sensors sensing movement and/or with respect to a surface; c) the frame supporting a third sensor that senses information (e.g., image data or mechanically readable data, including code, symbols, alphanumerics, and the like) from the surface at least in addition to movement; d) a communication link from the two sensing receivers to a data storage device. During, before or after storing, the signals are then treated through e) a communication link from the third sensor to a data storage device or to a processor and then a data storage device (e.g., processor, ASIC or FPGA); and there is f) a processor that determines position of the system with respect to the surface based at least in part on data from the two sensing receivers. The at least two sensors may be motion sensors. The motion sensors would preferably take images of points on a surface. The sensor could comprise either one of or a combination of an electromagnetic radiation emitter and electromagnetic radiation receiver. The electromagnetic radiation is preferably selected from the group consisting of IR radiation, visible light and ultraviolet radiation. The sensor may alternatively comprise a combination of an ultrasound emitter and ultrasound receiver. The third sensor is preferably an imaging array of sensors. The imaging sensor reads information on, in and/or under a surface being read, including non-invasive reading of subsurface cracks and other non-destructive evaluation and imaging techniques. There may also be an additional sensor present to assist in reading a fourth degree of movement, with at least a third one of the at least two sensors for reading curvature. The processor may also determine a position for each of the at least two sensing receivers with respect to time.

The device may also be capable of performing a process wherein the position of each of the two sensors is used to determine the position of the third sensor with respect to a surface being sensed.

In one embodiment, to overcome the need to heavily constrain CIS sensor motion, a device is developed that first determines the free path trajectory of the CIS sensor and then mathematically determines the proper location for the CIS output to be stored in memory accounting for possible rotation of the CIS sensor and/or displacements in the x and y axis. The technology described herein may use two sensors, such as laser mouse sensors to output x,y motion information located a finite, known distance apart. By knowing the distance between the sensors, rotational information of the device can be determined mathematically. The known rotational information and x,y displacement information is used to determine memory addresses for storing CIS scan data.

Looking at this system, a predefined point relative to the two sensors, conveniently shown here as a midpoint between the two sensors (the centroid point) is considered as the center of motion. With this centroid position between the two sensors known, movement of the device will also provide knowledge and data of a motion axis of rotation, such as that definable about the centroid. The axis of rotation can be mathematically translated to essentially any point along the line established between and extending through the two sensors. It is also possible to provide an arbitrary center of rotation anywhere on a plane containing the line between the two sensors. Theoretically, this center of rotation could be impractically defined as any specific point in the universe. Preferably, the centroid lies within a plane within which or on which the device is operating.

The determination of the properties of the surface that is being analyzed/recorded by the movement of the two sensors can be translated into useful information by conventional trigonometric relations and/or the use of more specialized algorithms to convert the raw data into structured meaning for later use. In this way, the data will enable a record to be formed of the specific path of the device as it moves across a surface, including incidental or significant rotational movement of the device with respect to the surface.

The recorded data of the movement of the device can be used with other information obtained during the passage of the device over the surface (e.g., sonogram data, scanned image date, even subsurface analysis by non-invasive observation techniques, even including X-ray, fluoroscopy, magnetic tracing and the like) and the data of the movement can be used to rationalize, correct, orient, reorient, or otherwise treat the other information to place it into better quality, higher quality, better resolution, more precise information content than would be available from that other information source by an uncorrected hand scan or even mechanical scan that is subject to vibration effects or other image deteriorating movement during obtaining of that other information.

This system and process enables the use of a free trajectory movement in combination with an imaging system. To illustrate this effect, consider standard fax or image copying. In both of these situations, the object to be imaged moves in a one-dimensional path relative to the imaging device (the object or the sensor moves linearly). All data is provided in a two-dimensional array because of the length and width of the image and the one dimensional relative movement of the sensor over that image. If in these older systems, there is rotational movement, such as the object being disturbed during imaging, a distortion of the data within the 2-dimensional image is created, and the system cannot adjust for the distortion.

With the present system, the analysis of the trajectory of the relative motion, which is also a function of the time during the imaging, such distortion can be corrected based on the knowledge of the two dimensional movement and rotation movement of the object acquired by the device contemporaneously with the acquisition of the other information, e.g., the image data. The analysis may or may not be contemporaneous with the acquisition of the other data or information, but may be exercised after both data have been acquired.

Because of the capability of correcting this other information or data, the relative movement of the two sensors of the device and the image being observed does not have to be as precise to obtain high quality information. In most present systems, the tolerance for variation in speed, rotational movement, or cross movement shift is very slight, and any such variations can significantly deteriorate the information obtained. With this correcting feature provided by the dual sensor system and subsequent correction of the other information, greater tolerance is enabled in the system, even to a point where hand scanning of an image can produce high quality images, even where there is significant pronation and rotation of a hand during scanning which would ordinarily greatly distort an image.

The system is also capable or being used in scanning a system with multiple and overlapping passes, which can actually increase the resolution of a final image by interpolation of data in combination with the correction of data. The ability to take multiple readings over a single surface or object to be observed, allows for a small scale device (e.g., a device with a 10 cm scan line) to scan the surface of a much larger object, as the scanned data can then be combined into a composite, since the dual scanner system provides substantive data of the relative location of information obtained from all scans. A composite can then be constructed from the totality of the scanned/observed/recorded other information and a final data description of the surface or object is created.

Specific uses for this device can be scanning written music, security checks, map reading, manufacturing defect analysis and determination, scanning and converting written material (for conversion to spoken language or for translation).

As noted, the fixed dimensional association of two computer mouse devices can simulate the function of the present system for 2D and rotational data. Mouse input devices for computers are well known in the art. The movement of the mouse in an X-Y plane typically actuates a mechanical, optical or electrical device within the mouse that produces X and Y position signals that are conveyed to the computer. The computer typically uses the mouse X and Y position signals to manipulate the display of the computer screen, allowing a user to control a program. A computer mouse also typically has one or more buttons which allow the user to further control a computer program. The mouse and mouse button allow the user to move a cursor or other pointing device to a specific area of the computer screen and depress the one or more buttons to activate specific computer program functions. The mouse buttons are actuated by pressing the button downward. The present device may or may not have the specific equivalent of the buttons on a mouse, but may have merely a single on-off or activation button. Typical and advanced mouse devices, with hard wire connections or RF or other wireless connections to a processor are described widely in the art, such as in Published US Applications 20070139376; 20070103436 (Optical Tracker with Tilt Detection);

The third scanner may be any scanner or data accessing/generating device as indicated herein, but is preferably an image scanner. Image scanner. In computing, a scanner is a device that analyzes images, printed text, or handwriting, or an object (such as an ornament) and converts it to a digital image. Most scanners today are variations of the desktop (or flatbed) scanner. The flatbed scanner is the most common in offices. Hand-held scanners, where the device is moved by hand, were briefly popular but are now not used due to the difficulty of obtaining a high-quality image. Both these types of scanners use charge coupled device (CCD) or Contact Image Sensor (CIS) as the image sensor, whereas older drum scanners use a photomultiplier tube as the image sensor.

Another category of scanner is a rotary scanner used for high-speed document scanning. This is another kind of drum scanner, but it uses a CCD array instead of a photomultiplier.

Other types of scanners are planetary scanners, which take photographs of books and documents, and 3D scanners, for producing three-dimensional models of objects, but this type of scanner is considerably more expensive relative to other types of scanners.

Figure 4A:
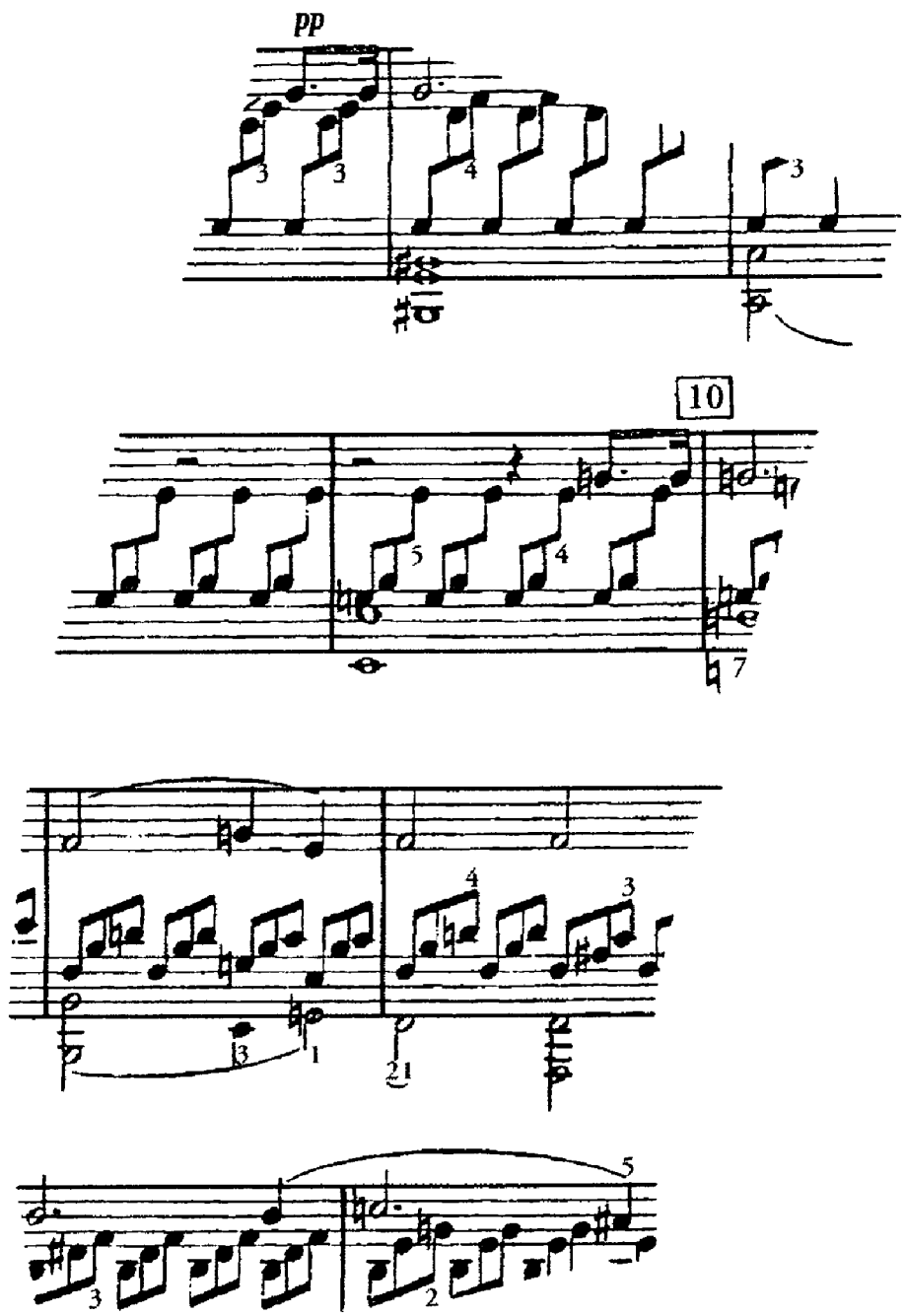
FIG. 4A shows a single hand swept read content of a musical score.

Another category of scanner is digital camerascanners which are based on the concept of reprographic cameras. Due to the increasing resolution and new features such as anti-shake, digital cameras become an attractive alternative to regular scanners. While still containing disadvantages compared to traditional scanners, digital cameras offer unmatched advantages in speed and portability. Nowadays there are different types of scanners depending on users purposes. Described below are the most commonly used types that can be found in the market:

FIG. 4A shows a single hand swept read content of a musical score.

Figure 4B:
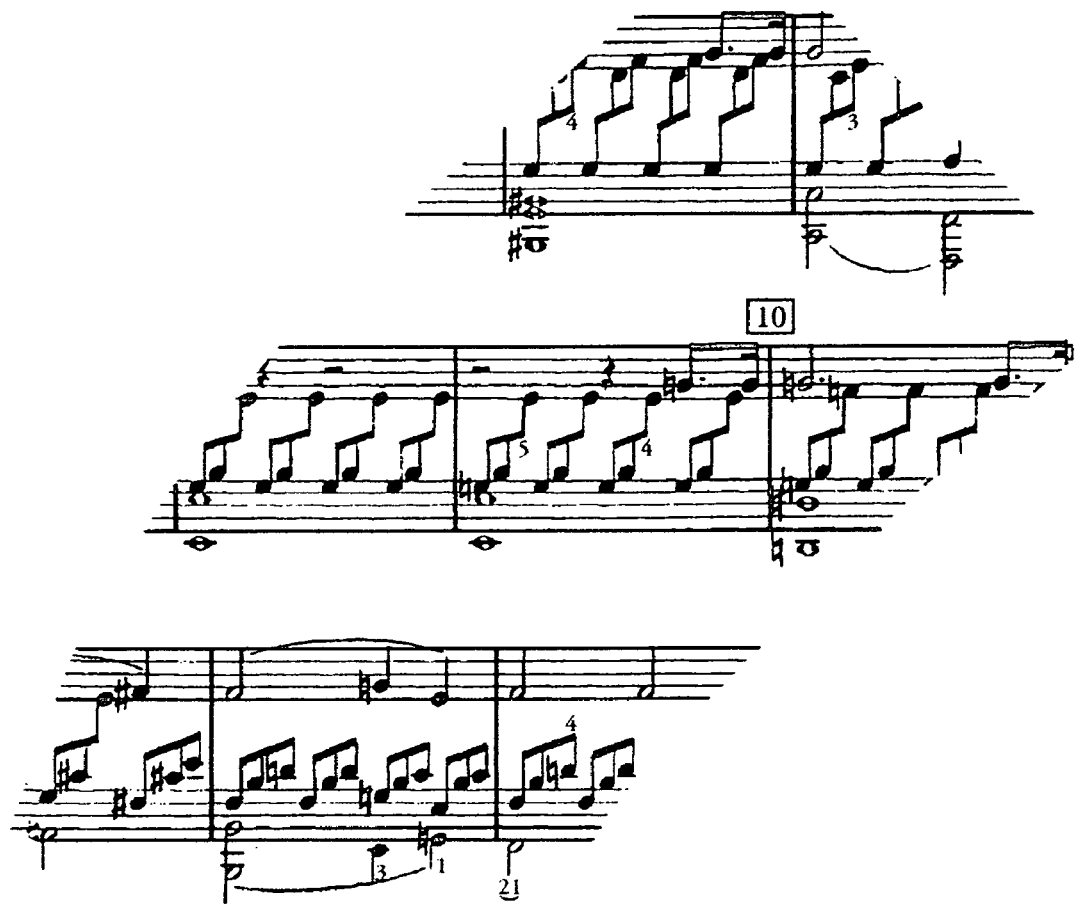
FIG. 4B shows a second single hand swept read content of a musical score that overlaps the read data of FIG. 4A.

FIG. 4B shows a second single hand swept read content of a musical score that overlaps the read data of FIG. 4A.

Figure 4C:
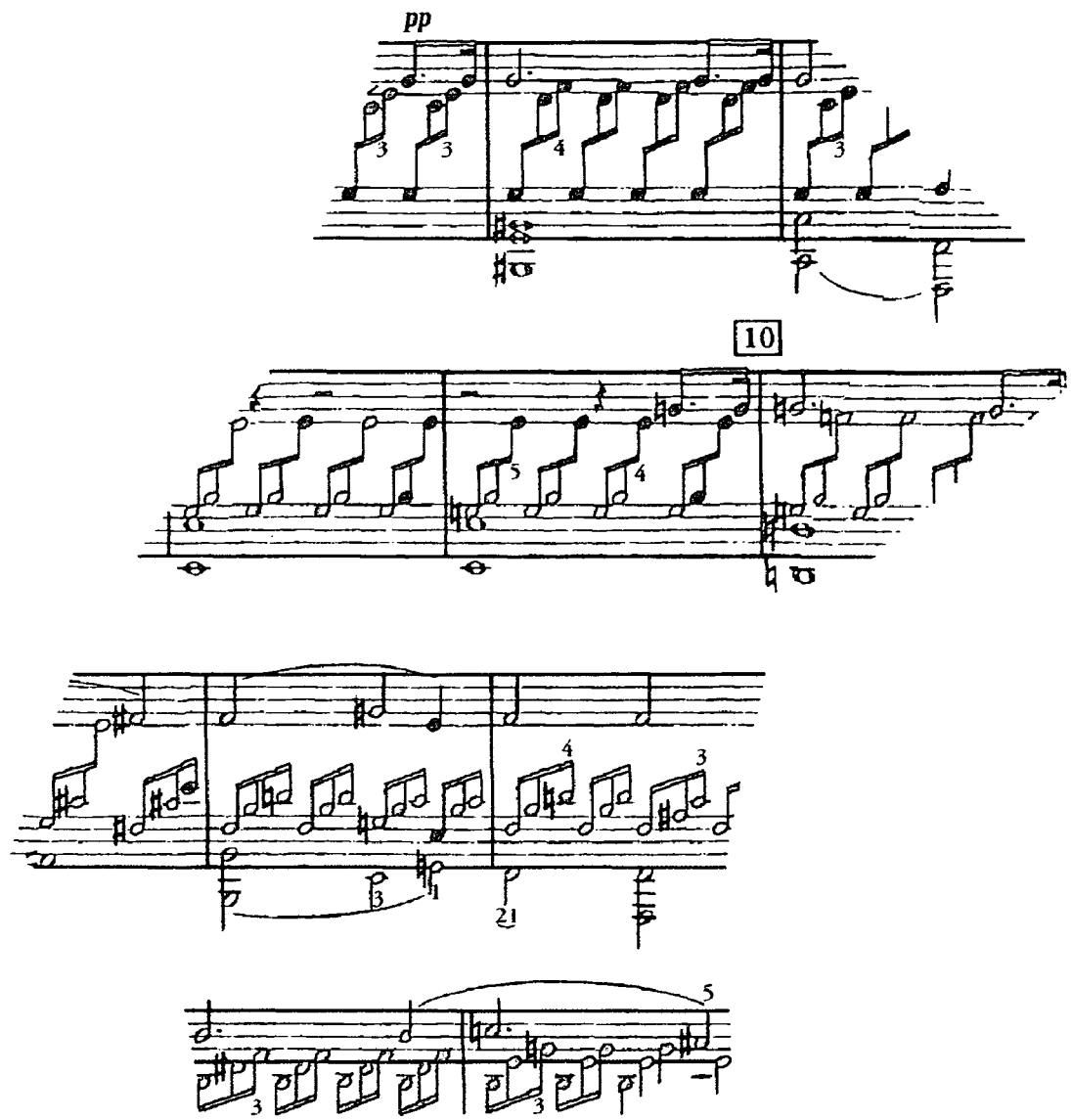
FIG. 4C shows a combination of the single hand swept read content of a musical score of FIGS. 4A and 4B.

FIG. 4C shows a combination of the single hand swept read content of a musical score of FIGS. 4A and 4B.

FIG. 4D shows a completely reconstructed musical score created from multiple individual hand sweeps such as those of FIGS. 4A and 4D.

A narrow and non-limiting description of a device enabled herein includes a device comprising:
 a) a frame;
 b) the frame supporting at least two sensing receivers and at least one emitter for the sensing receivers, the sensors sensing movement and/or position with respect to a surface;
 c) the frame supporting a third sensor that senses information from the surface at least in addition to movement;
 d) a communication link from the two sensing receivers to a data storage device or to a processor and then a data storage device;
 e) a communication link from the third sensor to a data storage device or to a processor and then a data storage device; and
 f) a system that determines position of the system with respect to the surface based at least in part on data from the two sensing receivers.

This device may have at least one additional subcomponent selected from the group consisting of:
 1) processing means to provide signal conversion capability between the optical navigation device and an at least 1 bit data port;
 2) the at least two sensors are separated by a distance of at least 0.5 cm such that a $3^{rd}$ motion axis of rotation about a surface normal vector (z-axis) may be derived using x-y motion data recovered from the at least two sensors;
 3) the device is coupled with an external processor selected from the group consisting of an FPGA, ASIC, CPU and computer to provide signal processing capability to determine rotation about the surface;
 4) processor for deriving free trajectory motion of an arbitrary center of rotation assumed or defined on the device;
 5) storage for recording free trajectory motion of the arbitrary center of rotation.
 6) communication means in the device for transfer of the free trajectory motion and/or the stored motion;
 7) communication system enabling the free trajectory motion information to be transferred in the form of displacement in an x and y direction and rotation about a defined axis;
 8) sensor selected from the group consisting of contact image sensors or CMOS sensors;
 9) a processor receiving output of the CIS and which stores the output according to a storage algorithm determined in part by the device operation characteristics;
 10) a processor containing executable code for an imaging storage algorithm utilizing the free trajectory path information and repeated output scans of an image sensor operated in conjunction with the trajectory sensor such that the free path trajectory is compensated for during memory storage of the CIS output;
 11) a processor containing executable code for the storage algorithm to compensate for the free path trajectory by determining the storage address for free path compensation mathematically;
 12) containing executable code for the storage address algorithm to be determined mathematically is calculated by a processor;
 13) a field programmable gated array or ASIC for determining mathematically the storage algorithm; or
 14) wherein the device comprises sensors such as a mouse sensor typically used for non-deterministic motion detection as when coupled to a computer cursor.

Drum

Drum scanners capture image information with photomultiplier tubes (PMT) rather than the charged coupled device (CCD) arrays found in flatbed scanners and inexpensive film scanners. Reflective and transmissive originals are mounted to an acrylic cylinder, the scanner drum, which rotates at high speed while it passes the object being scanned in front of precision optics that deliver image information to the PMTs. Most modern color drum scanners use 3 matched PMTs, which read red, blue and green light respectively. Light from the original artwork is split into separate red, blue and green beams in the optical bench of the scanner.

One of the unique features of drum scanners is the ability to control sample area and aperture size independently. The sample size is the area that the scanner encoder reads to create an individual pixel. The aperture is the actual opening that allows light into the optical bench of the scanner. The ability to control aperture and sample size separately is particularly useful for smoothing film grain when scanning black and white and color negative originals.

While drum scanners are capable of scanning both reflective and transmissive artwork, a good quality flatbed scanner can produce excellent scans from reflective artwork. As a result, drum scanners are rarely used to scan prints now that high quality inexpensive flatbed scanners are readily available. Film, however, is where drum scanners continue to be the tool of choice for high-end applications. Because film can be wet mounted to the scanner drum and because of the exceptional sensitivity of the PMTs, drum scanners are capable of capturing very subtle details in film originals.

Currently only a few companies continue to manufacture drum scanners. While prices of both new and used units have come down over the last decade they still require a considerable monetary investment when compared to CCD flatbed and film scanners. However, drum scanners remain in demand due to their capacity to produce scans which are superior in resolution, color gradation and value structure. Also, since drum scanners are capable of resolutions up to 12,000 PPL, their use is generally recommended when a scanned image is going to be enlarged.

In most current graphic arts operations, very high quality flatbed scanners have replaced drum scanners, being both less expensive and faster. However, drum scanners continue to be used in high-end applications, such as museum-quality archiving of photographs and print production of high-quality books and magazine advertisements. In addition, due to the greater availability of pre-owned units many fine art photographers are acquiring drum scanners, which has created a new niche market for the machines.

Flatbed

A flatbed scanner is usually composed of a glass pane (or platen), under which there is a bright light (often xenon or cold cathode fluorescent) which illuminates the pane, and a moving optical array, whether CCD or CIS. Color scanners typically contain three rows (arrays) of sensors with red, green, and blue filters. Images to be scanned are placed face down on the glass, an opaque cover is lowered over it to exclude ambient light, and the sensor array and light source move across the pane reading the entire area. An image is therefore visible to the charge-coupled device only because of the light it reflects. Transparent images do not work in this way, and require special accessories that illuminate them from the upper side.

Hand Scanner

Hand scanners are manual devices which are dragged across the surface of the image to be scanned. Scanning documents in this manner requires a steady hand, as an uneven scanning rate would produce distorted images. They typically have a "start" button which is held by the user for the duration of the scan, some switches to set the optical resolution, and a roller which generates a clock pulse for synchronisation with the computer. Most hand scanners were monochrome, and produced light from an array of green light emitting diodes (LEDs) to illuminate the image. A typical hand scanner also had a small window through which the document being scanned could be viewed. They were popular during the early 1990s and usually had a proprietary interface module specific to a particular type of computer, usually an Atari® ST or Commodore Amiga™

Quality

Scanners typically read red-green-blue color (RGB) data from the array. This data is then processed with some proprietary algorithm to correct for different exposure conditions and sent to the computer, via the device's input/output interface (usually SCSI or LPT in machines pre-dating the USB standard). Color depth varies depending on the scanning array characteristics, but is usually at least 24 bits. High quality models have 48 bits or more color depth. The other qualifying parameter for a scanner is its resolution, measured in pixels per inch (ppi), sometimes more accurately referred to as samples per inch (spi). Instead of using the scanner's true optical resolution, the only meaningful parameter, manufacturers like to refer to the interpolated resolution, which is much higher thanks to software interpolation. A typical flatbed scanner has an optical resolution of 1600-3200 ppi, high-end flatbed scanners can scan up to 5400 ppi, and a good drum scanner has an optical resolution of 8000-14,000 ppi.

Manufacturers often claim interpolated resolutions as high as 19,200 ppi; but such numbers carry little meaningful value, because the number of possible interpolated pixels is unlimited. The higher the resolution, the larger the file. In most cases, there is a trade-off between manageable file size and level of detail.

The third important parameter for a scanner is its density range. A high density range means that the scanner is able to reproduce shadow details and brightness details in one scan.

Computer Connection

Scanning the document is only one part of the process. For the scanned image to be useful, it must be transferred to a computer or at least a processor that provides the image data which is then stored. The amount of data generated by a scanner can be very large: a 600 DPI 9"×11" (slightly larger than A4 paper) uncompressed 24-bit image consumes about 100 megabytes of uncompressed data in transfer and storage on the host computer. Recent scanners can generate this volume of data in a matter of seconds, making a fast connection desirable. There are four common connections used by scanners:

Parallel—Connecting through a parallel port is the slowest transfer method available. Early scanners had parallel port connections that could not transfer data faster than 70 kilobytes/second.

Small Computer System Interface (SCSI), which is supported by most computers only via an additional SCSI interface. Some SCSI scanners are supplied together with a dedicated SCSI card for a PC, although any SCSI controller can be used. During the evolution of the SCSI standard speeds increased, with backwards compatibility; a SCSI connection can transfer data at the highest speed which both the controller and the device support. SCSI has been largely replaced by USB and Firewire, one or both of which are directly supported by most computers, and which are easier to set up than SCSI.

UNIVERSAL SERIAL BUS (USB) scanners can transfer data fast, and are easier to use and cheaper than SCSI devices. The early USB 1.1 standard could transfer data at only 1.5 megabytes per second, but the later USB 2.0 standard can theoretically transfer up to 60 megabytes per second (although everyday rates are much lower), resulting in faster operation.

FIRE WIRE is a somewhat faster interface than USB. FireWire is ideal for scanning high-resolution images which require the transfer of much data.

A computer needs software, called a driver, that knows how to communicate with the scanner. Most scanners use a common language, TWAIN. The TWAIN driver, originally used for low-end and home-use equipment and now widely used for large-volume scanning, acts as an interpreter between any application that supports the TWAIN standard and the scanner. This means that the application does not need to know the specific details of the scanner in order to access it directly. For example, you can choose to acquire an image from the scanner from within Adobe Photoshop because Photoshop supports the TWAIN standard.

Other scanner drivers that can be also used are:
ISIS, created by Pixel Translations, which still uses SCSI-II for performance reasons, is used by large, departmental scale, machines.
SANE (Scanner Access Now Easy) is a fre/open source API for accessing scanners. Originally developed for UNIX and Linux operating systems, it has been ported to OS/2, Mac OSX and Microsoft® Windows. Unlike TWAIN, SANE does not handle the user interface. This allows batch scans and transparent network access without any special support from the device driver.

In addition to the driver, most scanners come with other software. Typically, a scanning utility and some type of image editing application are included. A lot of scanners include OCR software. OCR allows you to scan in words from a document and convert them into computer-based text. It uses an averaging process to determine what the shape of a character is and match it to the correct letter or number.

Output Data

The scanned result is a non-compressed RGB image which can be transferred to a computer's memory. Some scanner compress and clean up the image using embedded firmware. Once on the computer, the image can be processed with a raster graphics program (such as Photoshop or the GIMP) and saved on a storage device (such as a hard disk).

In common use, scanned pictures are stored on a computer's hard disk, normally in image formats such as JPEG, TIFF, Bitmap and PNG. Some scanners can also be used to capture editable text, so long as the text can be read by the computer in a discernable font. This process is called Optical Character Recognition (OCR).

Document Processing

The scanning or digitization of paper documents for storage is quite different from the scanning of pictures for reproduction though it uses some of the same technology. While document scanning can be done on general-purpose office scanners, in major operations it is performed on dedicated, specialized scanners, manufactured by companies like Atiz Innovation, Bowe Bell and Howe, Canon, Epson, Fujitsu, HP, Eastman Kodak and others.

Document scanners have document feeders, generally larger than those found on copiers or all-purpose scanners. They scan at lower resolution than other scanners, usually in the range 150 dpi (dots per inch) to 300 dpi, since higher resolution is usually not needed and makes files much larger to store.

A lot of scans can be made at high speed, traditionally in grayscale but now in color as well. Many are capable of duplex (two-sided) scanning at or near full speed (20 ppm (pages per minute) to 150 ppm). Sophisticated document scanners have either firmware o or software that "cleans up" scans as they are produced, eliminating accidental marks and sharpening type. They also usually compress the scan on the fly.

Many document scans are converted using OCR technology into searchable files. Most scanners use ISIS or Twain device drivers to scan documents into TIFF format so that the scanned pages can be fed into a document management system that will handle the archiving and retrieval of the scanned pages.

The biggest issues with document scanning are preparation and indexing. Preparation involves taking the papers to be scanned and making sure that they are in order, unfolded, without staples or anything else that might jam the scanner. This is a manual task and can be time consuming. Indexing involves associating keywords with files so they can be found later. This process can be automated in some cases, but may involve manual labour. One common practice is the use of barcode recognition technology. During the preparation process, barcode sheets are inserted into the document files, folders and document groups. Using automatic batch scanning, the documents are saved into the appropriate folders and an index is created for integration into document management software systems.

A specialized form of document scanning is book scanning. Technical difficulties arise from the books usually being bound and sometimes fragile and irreplaceable, but some manufacturers have developed specialized machinery to deal with this. For instance, Atiz DIY scanner uses a V-shaped cradle and a V-shaped transparent platen to handle brittle books. Often special robotics are used to turn the pages automatically.

Scanner Music

Flatbed scanners are capable of synthesising simple musical scores due to the variable speed (and tone) of their stepper motors. This property can be applied for hardware diagnostics, for example the HP Scanjet 5 plays music if powered on with SCSI ID set to zero. Windows and Linux based software is available for several brands and types of flatbad scanners to play MIDI files for fun purposes.

Any mouse functionality may be used for each of the pair of trajectory scanners. These are commercially available from almost all computer manufacturers and OEM suppliers as the optical system for the computer mouse.

A view of FIG. 1 will assist in an understanding of the present technology. FIG. 1 shows a scanning face of a moveable device 2 according to the present technology having a line or array of image scanners/sensors 3 and two emitting/receiving position LED sensors 4 and 6 and an artificial, but preselected, "centroid" point 8. Based on the knowledge of the relative location of the two LED sensors 4 and 6 and the centroid point 8, software in a processor can read data from the paired LED sensors to determine movement with respect to length, width and angularity. At the same time, and recorded with respect to the time of the two LED measurements/sensings, the scanners 3 provide image data. To whatever degree the scanned image data from sensor array 3 is distorted by movement of the device 2 across a surface to be imaged, the data from the dual sensors 4 and 6 establish a trajectory (e.g., 2D and angularity/rotation) that can be used to correct distortions in the scanned data from the array 3. A wireless transmitter 10 has a communication link 14 to the processor 12.

The Recorder/Player Description

The recorder/player is a portable, hand held and hand driven device for first reading standard musical notation, in the format commonly known as staff, recognizing the music patterns, notes, clef, time signature, key, etc. by signal processing and then reproducing said music audibly. The device also has the capability of outputting the music in MIDI format for direct real-time use to a MIDI instrument or for later download to a computer music interface, sequencer, etc.

The recorder/player is a one dimensional scanning device that operates by acquiring one line of an optical image at a time. By moving the scanner across the music staff, repeated scans allow an image of the staff to be reproduced. Signal processing allows the musical symbols to be recognized and buffered. Subsequently, the music can be played from the device using built-in small loudspeaker or it can be outputted to the headset jack, or other interface to store the music in the computerized format such as MIDI. The system could be connectable to a display, permanent storage, a printer, a synthesizer and/or other input coding or music output device.

The scanner height is longer than usual average height of the music notation line including the double or grand staff used for piano. Preferably, the scanner height is 1.5-3 inches. The device has a built-in 3-axis positioning system which allows it to determine the location and rotation of the scanner with regards to the music notation line. Combining the positioning results with line scans via a reconstruction algorithm allows the scanner to reconstruct the two dimensional images of the musical staff regardless of the scanner rotation. This design allows the scanner size to be small and easy to operate.

The scanner should recognize the key, time signature and clef data as well as other notation features, such as staff lines, stems, flags, beams, articulation marks, etc associated with note values. The scanner should be preferable battery power device. The typical usage of the device could be as a tool to play the music for those who try to learn playing a musical instrument, as a tool to play short segment of the music in any place of the melody. Additionally, the scanner can be used to output MIDI signals directly to a sequencer and/or computer for storage, or directly to a MIDI device for real-time play.

The invention claimed is:

1. A method for determining the location of at least two points on an imaging or scanning device with respect to a surface during obtaining of data from the surface or under the surface, the method comprising: while moving a device across a surface and while obtaining data, taking at least two position readings on the surface from the device from fixed locations on the device; while taking two position readings from the device, obtaining information on the surface from a third sensor on the device; using readings from the at least two position readings to determine a position of the imaging or scanning device relative to the surface; and using the position readings of the device relative to the surface to modify the information obtained from on the surface.

2. The method of claim 1 wherein the taking of two position readings is done continuously while moving the device.

3. The method of claim 1 wherein the sensor is an image sensor and the information obtained is image data.

4. The method of claim 1 wherein the device is moved manually across the surface.

5. The method of claim 1 wherein the readings from at least two position sensors and the information obtained from on the surface is used to correct distortion in the obtained information and then to store corrected information.

6. The method of claim 2 wherein the readings from at least two position sensors and the information obtained from on the surface is used to correct distortion in the obtained information and then to store corrected information.

7. The method of claim 3 wherein the readings from at least two position sensors and the information obtained from on the surface is used to correct distortion in the obtained information and then to store corrected information.

8. The device of claim 1 wherein the device comprises an optical navigation device capable of performing deterministic motion measurements wherein the output of the device is a measurement of two-dimensional motion on a planar surface.

9. The device of claim 1 having at least one additional subcomponent selected from the group consisting of: a) processing means to provide signal conversion capability between the optical navigation device and an at least 1 bit data port; b) the at least two sensors are separated by a distance of at least 0.5 cm such that a 3.sup.rd motion axis of rotation about a surface normal vector (z-axis) may be derived using x-y motion data recovered from the at least two sensors; c) the device is coupled with an external processor selected from the group consisting of an FPGA, ASIC, CPU and computer to provide signal processing capability to determine rotation about the surface; d) processor for deriving free trajectory motion of an arbitrary center of rotation assumed or defined on the device; e) storage for recording free trajectory motion of the arbitrary center of rotation; f) communication means in the device for transfer of the free trajectory motion and/or the stored motion; g) communication system enabling the free trajectory motion information to be transferred in the form of displacement in an x and y direction and rotation about a defined axis; h) sensor selected from the group consisting of contact image sensors or CMOS sensors; i) a processor receiving output of the CIS and which stores the output according to a storage algorithm determined in part by the device operation characteristics; j) a processor containing executable code for an imaging storage algorithm utilizing the free trajectory path information and repeated output scans of an image sensor operated in conjunction with the trajectory sensor such that the free path trajectory is compensated for during memory storage of the CIS output; k) a processor containing executable code for the storage algorithm to compensate for the free path trajectory by determining the storage address for free path compensation mathematically; l) containing executable code for the storage address algorithm to be determined mathematically is calculated by a processor; m) a field programmable gated array or ASIC for determining mathematically the storage algorithm; n) wherein the device comprises sensors such as a mouse sensor typically used for non-deterministic motion detection as when coupled to a computer cursor.

* * * * *